3,663,429
PROCESS FOR HYDROCONVERSION OF RAW SHALE OIL
Barney Vallino, Homewood, Ill., assignor to Atlantic Richfield Company, New York, N.Y.
No Drawing. Filed Apr. 9, 1970, Ser. No. 27,126
Int. Cl. C10g 9/14, 13/00
U.S. Cl. 208—108                7 Claims

ABSTRACT OF THE DISCLOSURE

The process of catalytically hydrogenating and/or hydrocracking raw shale oil is improved by incorporating in the feedstock a heavy mineral oil such as high boiling shale oil fractions and high boiling petroleum fractions of desirable properties to prevent substantial amounts of deposits from accumulating in the preheater and in the reactor catalyst bed.

---

This invention relates to catalytic hydrocarbon conversion processes. More particularly, the invention is directed to an improved system for conducting catalytic hydrogenation and/or hydrocracking of raw shale oils whereby heater and reactor deposits are minimized, catalyst activity is maintained at a suitable level and catalyst bed plugging is alleviated.

Basically, shale oil is obtained by crushing a rock-like substance called oil shale, and then heating the latter to obtain the raw hydrocarbon shale oil as a vapor which is carried overhead and collected. The raw shale oil is then hydrogenated and/or hydrocracked to render it more suitable for further refining and to reduce its pour point so that it can be transported through conventional pipelines. In this hydroconversion, the shale oil is pumped through the tubes of a heater wherein the temperature of the feed is raised to about 700–900° F., depending on the conversion desired. A hydrogen feed stream is added to the shale oil feedstock before or after the heater, for instance, in the amount of about 2000 to 14,000 s.c.f./bbl. of the heavy oil blend fed to the reaction zone. After the heater, the feed stream, including the hydrogen, is passed to a reactor for conversion at elevated pressures such as about 500 to 2500 p.s.i.g. After processing, the effluent removed from the reactor can be cooled and recovered. Among the purposes of the process are the removal of much of the nitrogen, sulfur and oxgen from the shale oils and sufficient hydrocracking of the feedstock to reduce its pour point to make it practical for transportion by pipeline.

The solid catalysts used in these high temperature conversions of shale oil relatively quickly become at least partially fouled by carbonaceous materials. This problem is unusually severe when the hydroconversion is effected with the removal of one or more of nitrogen, sulphur and metallic contaminants from the hydrocarbon being processed. Of the several catalytic hydroconversion processes known, fixed-bed processes are preferred because of their simplicity, despite the fact that they are more susceptible to catalyst fouling problems. Other catalytic hydroconversion processes such as those involving moving or fluid catalyst beds or catalyst slurry processes present less catalyst fouling problems, but are complex operations which require substantial investment in expensive equipment. In fixed-bed processes, plugging most frequently occurs in the heater and in the top portions of reactor catalyst beds. The plugs are comprised of carbonaceous and inorganic materials. Metals either originally combined in the hydrocarbon feed, or carried therein as a suspension, also make up a portion of the plug. Suspended solids are deposited as the feedstocks vaporize or crack. Chemically combined metals are deposited as the molecules containing them crack. Coke can also be deposited when formed by the polymerization of compounds or the cracking of viscous portions of the feed which remain in the liquid state after a major portion of the shale oil feed is vaporized. This viscous material cannot move into the reaction zone of the catalyst bed where hydrogenation and hydrocracking can take place until it is thermally cracked and coke is formed. In any event, during the preheat period considerable reaction can and does take place and material does deposit causing reactor plugging. It has been found in some instances that, of the feed, fully 82% of all fines, 53% of all carbon and 80% of all iron was deposited in the preheat zone of an experimental reactor at temperatures less than reactor operating temperature. These deposited materials interacted to cause a plug which resulted in reactor pressure drops such that processing could no longer be conducted.

Heretofore, several methods have been utilized to overcome the decrease of catalytic activity due to plugging during hydrocarbon residual stock hydroconversion processes. Many of these methods involve an interruption of the hydroconversion process. One method is to interrupt the process, remove the catalyst from the hydroconversion system and replace the fouled catalyst with a fresh charge. Another method is to take the reactor containing the fouled catalyst off-stream, remove the entrained reactants, and then regenerate the catalyst by introducing air or other oxygen-containing gas at high temperature to burn off the deposits. Other methods are to remove the fouled catalyst from the system and either wash it with a suitable solvent to remove tarry deposits or, treat it with a sulphurizing vapor, chlorinate the catalyst and wash it with an aqueous chelate-containing medium to remove metallic deposits, and return the cleaned catalyst to the system.

The present invention involves an improvement in the method of hydrogenating and/or hydrocracking raw shale oils. The improvement involves the method of combining raw shale oil with a selected heavy mineral oil as a feedstock to prevent substantial amounts of deposits from accumulating in preheaters and reactor catalyst beds. This method is practical, economical and time-saving because the heater and reactor are effectively flushed in situ by the feed itself without interruption of the hydroconversion process. The method results in the formation of a feed of sufficiently high boiling range to allow a sufficient portion to remain liquid and free flowing in the reactor. The raw shale oil-heavy mineral oil combination functions to keep polymers or heavy shale oil residuums in solution in a free flowing liquid that carries these heavy materials into reactors where they can be hydrogenated. This action prevents viscous residues from forming and coking in preheat, hydrogenation and hydrocracking sections due to long residence in the reactors. The high boiling combination also acts as a flushing agent to flush solids on through the preheater and reactor.

It is an object of the present invention to provide a method for hydrogenating and/or hydrocracking raw shale oil hydrocarbon stocks in fixed, macrosized catalyst beds. It is a further object to provide a method of reducing the plugging of preheaters and conducting hydroconversion in fixed catalyst beds for economically attractive periods of time. It is still a further object of this invention to provide a method for hydroconverting raw shale oil stocks in fixed catalyst beds without undue pressure drop across the bed and without excessive blocking and fouling of the bed and concurrent loss of catalyst activity. These and other objects are realized by the method disclosed herein.

The process of the present invention comprises conducting the foregoing described shale oil hydrogenation and/or hydrocracking (hydroconversion) processes with a charge stock composed of raw shale oil and a selected heavy mineral oil to alleviate fouling or plugging of the preheater and fixed catalyst bed. This is done without interruption of the hydroconversion process.

The method of this invention is such that the raw shale oil-heavy mineral oil charge is passed with or without hydrogen through a tubular heater where the feed is brought to reaction temperature, and, with hydrogen, through a fixed bed of macrosized catalyst in a hydrogenation and/or hydrocracking reaction zone to reduce plugging and other deposit problems. The charge stocks can be passed to the reactor without being sent through a preheater but with less advantage. In such case, the separate components of the feed will be separately heated to reaction temperature. Also the hydrogen may, if desired, be sent with the blend through the preheater. The heavy mineral oil should be incorporated with the raw shale oil feedstock in amounts of about 10 to 75 or more weight percent, preferably about 15 to 40 weight percent, of the raw shale oil-heavy mineral oil combination.

The raw shale oil stock may be derived from any of the various retorting methods. Preferably, the oil should be a clean shale oil, i.e., shale oil from which suspended solids and emulsified water have been removed. The raw shale oil should have a 90% boiling point (volume percent distilled) of at least about 900° F. Often, such oils have an initial boiling point (IBP) in the range of about 140 to about 600° F., preferably in the range of about 180 to 500° F. The raw shale oil usually has a gravity in the range of about 17.5 to about 23.5° API. The kinematic viscosity of the oil is frequently about 20 to 30 centistokes, preferably from about 24 centistokes to 28 centistokes, at 122° F. At 210° F., kinematic viscosity of the oil is often about 2 to 12 centistokes, preferably from about 5.0 to 7.2 centistokes. The minimum flash point of the oil is frequently about 100 to 400 COC° F., preferably about 200 to 300 COC° F.

The heavy mineral oil used in the feedstock of this invention is not a raw shale oil and includes, among others, high boiling petroleum gas oils, especially deasphalted residual gas oils, and hydrogenated-hydrocracked shale oils. However, the various heavy mineral oils having the essential characteristics needed to form the desired feedstocks of this invention, can be used. The deasphalted gas oil or other high boiling hydrocarbons can be derived from petroleum asphalts, for instance, from conventional straight-reduced, thermal, or air-blown petroleum asphalts. The heavy mineral oil portion of the feedstocks of this invention can also be obtained by fractionation of the effluent obtained from hydroconverting the raw shale oil-heavy mineral oil as disclosed in the process of this invention. This fractionated heavy mineral oil product can then be incorporated as a blend with raw shale oil and recycled as feed to the catalytic reactor for processing.

The heavy mineral oil employed in this invention generally has a 5% boiling point of at least about 700° F., preferably at least about 800° F., and often the 40% boiling point is in the range of about 950 to 1150° F. The gravity of the oil is often in the range of about 20.0 to 26.6° API. The heavy mineral oil has an asphaltene content of less than about 0.1 weight percent, and an ash content of less than about 0.01 weight percent. The kinematic viscosity of deasphalted gas oil at 100° F., can be, for instance from about 500 to 550 centistokes, preferably about 525 to 540 centistokes, and at 210° F. it can be from about 25 to 40 centistokes, preferably from about 30 to 35 centistokes. The minimum flashpoint of deasphalted gas oil is often from about 80 to 340 COC° F., preferably it should be from about 150 to 280 COC° F.

The catalysts employed in the hydroconversion processes of this invention are of the macrosize variety, i.e., at least about $\frac{1}{64}$ inch up to about ½ inch or more in diameter. Catalyst particle lengths can be of similar dimensions but may extend up to about 1 inch or somewhat more. Generally, the catalyst is one of the sulfactive types, i.e. sulfur-resistant, having a catalytic promoter selected from the metals of Groups VI and VIII of the Periodic Table, especially mixtures of metals from each of these groups. The metals can be elemental or in combined form and are usually disposed on a support of relatively high surface area. Examples of satisfactory catalytic promoters include nickel oxide or sulfide, tungsten oxide or sulfide, molybdenum oxide or sulfide, etc. Particularly desirable is a mixture of nickel oxide and/or sulfide with tungsten oxide and/or sulfide, or a mixture of cobalt or nickel oxide and/or sulfide with molybdenum oxide and/ or sulfide. These catalytic promoters are usually deposited in minor, catalytically-effective amounts, e.g. about 1 to 30 weight percent based on the promoting metals, on porous solid carriers such as activated alumina or on a more acidic or cracking support such as silica-alumina, etc. An often used catalyst is cobalt or nickel molybdate on alumina or silica-alumina. The catalysts which can preferably be employed in the hydrogenation-hydrocracking processes of this invention can have a combination of tungsten and nickel or molybdenum and nickel, supported on a carrier of silica-alumina. For hydrogenation, a preferred catalyst can contain nickel and molybdenum on alumina.

The hydroconversion processes of this invention are conducted at elevated temperatures at which the aforementioned deposit problems are encountered, e.g. in the range of about 600° to 1100° F., preferably 700 to 950° F. Other suitable reaction conditions often include an elevated pressure of about 200 to 5000 p.s.i.g., preferably about 400 to 1000 p.s.i.g., and a hydrogen feed rate of about 250 to 14,000, preferably about 1500 to 12,000 standard cubic feet per barrel of raw shale oil-heavy mineral oil feed. Suitable space velocities include those in the range of about 0.1 to 15, preferably about 0.5 to 8, WHSV.

When hydrogenation of the hydrocarbon feed of this invention is to be effected with little or no hydrocracking, the operation is advantageously conducted at temperatures of about 500° to 725° F. During such primarily hydrogenation operations, there can be some cracking of the raw shale oil-heavy mineral oil mixture to hydrocarbon materials boiling lower than the initial boiling point of the hydrocarbon feed, but the extent of cracking can be as desired.

Hydrocracking-hydrogenation conditions are more severe than those used for hydrogenation, and cracking of the charge stocks of this invention desirably can be sufficient to convert at least about 20, preferably about 30 to 60, weight percent of the feed blend to materials boiling below the initial boiling point of the blend. The hydrocracking can be conducted at temperatures of about 700 to 1000° F., preferably about 750 to 875° F. Hydrogen partial pressure can be about 300 to 5000 p.s.i., preferably about 500 to 3000 p.s.i.

Several processing runs using raw shale oil alone as opposed to the raw shale oil-heavy mineral oil mixture of this invention have been conducted to show the effect of these feedstock upon catalyst bed plugging. The results of these runs are shown in the examples below. In each of the examples the preheated feedstock was fed directly onto a 50 gram, 8 inch deep, settled fixed bed of macro-size nickel - molybdenum - silica-alumina catalyst (about 10% NiO, and 25% $MoO_3$) that was charged to the top of a 1 inch tube. A 1 inch stainless steel grid was used to separate the catalyst sample from the postheat section of the tube, which section was charged with 8–14 mesh crushed-alumina support. In general, the postheat was kept below 600° F. to minimize postheat thermal effects.

The first two examples show that when raw, full range shale oil is processed alone, the preheat coil, catalyst bed and the postheat sections were plugged and there were consequent drops in pressure. However, Example 3 shows that when 20 weight percent deasphalted residual petroleum gas oil was incorporated into the raw, full range shale oil feedstock, no plugging was seen in the preheat sections. Although some fines accumulated in the catalyst bed there was no bridging and there was no noticeable increase in reactor pressure drop.

EXAMPLE I

A raw, full range shale oil (A of Table I), preheated in a lead bath preheat coil, was processed at 2500 p.s.i.g., 2 WHSV, 800–850° F., and 12,000 hydrogen s.c.f./bbl. over a catalyst of nickel and molybdenum supported on a silica-alumina carrier. Under these conditions there was plugging of the catalyst and the reactor showed a differential pressure increase of from 0 to 19 p.s.i.g. in 125 hours of processing. The plug material was loosened by depressurizing the reactor and processing was continued for 490 hours total with periodic depressuring of the reactor to free subsequent restrictions. At 490 hours, this technique no longer worked. Upon examination of the reactor it was found that the top of the catalyst bed was filled with fines and the preheater was plugged.

EXAMPLE II

The raw, full range shale oil (A of Table I), preheated in the lead bath preheat coil reactor, was processed at 2500 p.s.i.g. 10 WHSV, 835° F., and 12,000 hydrogen s.c.f./bbl. over a catalyst bed similar to that of Example I. The test run of Example II was discontinued after 84 hours because of reactor restriction. The catalyst bed showed a collection of fines and was partially restricted.

The following example further illustrates this invention and is a preferred embodiment thereof.

EXAMPLE III

A blend (C of Table I), of 80% raw, full range shale oil (A of Table I) and 20 weight percent of a deasphalted, residual petroleum gas oil (B of Table I) was employed as a feedstock. This feedstock blend was preheated in the lead bath coiled preheater and was processed for 296 hours at 2500 p.s.i.g., 2 WHSV, 820° F., and 12,000 hydrogen s.c.f./bbl. over a fresh bed of the nickel-molybdenum-silica-alumina catalyst of Example I. After 290 hours of processing with this oil feedstock blend to obtain about 92% of 100 to 1050° F. boiling range hydrocarbons, there was no sign of a reactor differential pressure rise. Upon inspection, the preheater was found to be free of deposits and, although the catalyst contained some fines, the reactor was free of bridging.

TABLE I
Feedstock Inspections

| Identity | A<br>Raw full range shale oil | B<br>Deasphalted gas oil | C<br>Blend gt 80 weight percent A and 20 weight percent B |
|---|---|---|---|
| Gravity,° API | 19.8 | 23.2 | 20.8 |
| Pour,° F | +85 | 120+ | +85 |
| Kinematic viscosity, 100° F | | 533 | |
| Kinematic viscosity, 122° F | 26.10 | | ca. 75 |
| Kinematic viscosity, 210° F | 6.132 | 33.89 | 8.007 |
| Flash COC,° F | 215 | 540 | 225 |
| Fire COC,° F | 250 | 665 | 270 |
| Carbon residue, Conradson, wt. percent | 4.04 | | 3.18 |
| Ash, ASTM, wt. percent | 0.0180 | 0.000 | .0094 |
| Carbon, wt. percent | | 86.29 | 84.90 |
| Hydrogen, wt. percent | 11.35 | 12.73 | 11.57 |
| Nitrogen, wt. percent | 2.20 | 0.00001 | [1] 1.87; [2] 1.88 |
| Oxygen, wt. percent | | 0.48 | 0.97 |
| Sulfur, X-ray, wt. percent | 0.680 | | .662 |
| Water, Fisher, wt. percent | 0.22 | | |
| Nickel, p.p.m. | | | 4 |
| Iron, p.p.m. | 98 | | 144 |
| Vanadium, p.p.m. | 0.6 | | |
| ASTM distillation, vol. percent, ° F.: | | | |
| IBP | 412 | 592 | 471 |
| 5 | 468 | 885 | 531 |
| 10 | 519 | 936 | 633 |
| 20 | 598 | 988 | 726 |
| 30 | 667 | 1,020 | 808 |
| 40 | 737 | 1,051 | 814 |
| 50 | 795 | | 942 |
| 60 | 851 | | 1,006 |
| 70 | 911 | | |
| 80 | 975 | | |
| 90 | [3] 1,043 | | |
| 95 | | | |
| Trap-ml | 4.7 | | 4.0 |

[1] Top drum.
[2] Bottom drum.
[3] 87 percent.

Table II shows pressure drop as a function of hours-on-oil for each of the examples.

TABLE II

| | Pressure drop (p.s.i.g.) | Hours-on-oil |
|---|---|---|
| Example I | 19 | 125 |
| Example II | 6.75 | 82.5 |
| Example III | 0 | 290 |

It is claimed:

1. A process for the hydroconversion of raw shale oil which comprises hydroconverting a hydrocarbon feedstock by contact with a fixed bed of solid hydroconversion catalyst and at an elevated temperature at which deposits in said bed are formed from said feedstock and in the presence of molecular hydrogen, said feedstock being comprised of raw shale oil and about 10 to 75 percent of a heavy mineral oil other than raw shale oil to alleviate plugging of said bed, and said heavy mineral oil having a 5% boiling point of at least about 700° F., a 40% boiling point in the range of about 950 to 1150° F., an API gravity of about 20 to 26.6, an asphaltene content of less than about 0.1 weight percent, and an ash content of less than about 0.01 weight percent.

2. The method of claim 1 in which the feedstock is passed through a tubular heater prior to contact with said catalyst.

3. The method of claim 1 in which the feedstock is hydrocracked at a temperature of about 700 to 875° F.

4. The method of claim 3 in which the heavy mineral oil is about 15 to 40% of said hydrocarbon feedstock.

5. The method of claim 4 in which the heavy mineral oil is a deasphalted, residual, petroleum gas oil.

6. The method of claim 5 in which the feedstock is passed through a tubular heater prior to contact with said catalyst.

7. The method of claim 6 in which the hydrocracking is conducted at about 775 to 875° F. and about 500 to 3000 pounds per square inch hydrogen partial pressure.

References Cited

UNITED STATES PATENTS 3,412,010  11/1968  Alpert et al. _____ 208—108
3,549,517  12/1970  Lehman et al. _____ 208—108

CURTIS R. DAVIS, Primary Examiner

U.S. Cl. X.R.

208—48